US012585293B2

(12) United States Patent
Vo et al.

(10) Patent No.: US 12,585,293 B2
(45) Date of Patent: Mar. 24, 2026

(54) SYSTEM AND METHOD FOR ORCHESTRATING DRONE SWARMS

(71) Applicant: AT&T Intellectual Property I, L.P., Atlanta, GA (US)

(72) Inventors: Chris Vo, Sachse, TX (US); Abhay Dabholkar, Allen, TX (US); Jeffrey Dix, Rowlett, TX (US); James H. Pratt, Round Rock, TX (US); Eric Zavesky, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 76 days.

(21) Appl. No.: 18/603,702

(22) Filed: Mar. 13, 2024

(65) Prior Publication Data

US 2025/0291365 A1      Sep. 18, 2025

(51) Int. Cl.
| | |
|---|---|
| *G05D 1/69* | (2024.01) |
| *G05D 1/656* | (2024.01) |
| *G05D 105/20* | (2024.01) |
| *G05D 109/20* | (2024.01) |

(52) U.S. Cl.
CPC .............. *G05D 1/69* (2024.01); *G05D 1/656* (2024.01); *G05D 2105/20* (2024.01); *G05D 2109/20* (2024.01)

(58) Field of Classification Search
CPC ...... G05D 1/69; G05D 1/656; G05D 2109/20; G05D 2105/20
See application file for complete search history.

(56) References Cited

U.S. PATENT DOCUMENTS

| | | | | |
|---|---|---|---|---|
| 9,454,151 | B2 * | 9/2016 | Srivastava | ............... G08G 1/00 |
| 12,038,767 | B2 * | 7/2024 | Huang | .................. H04W 4/029 |
| 12,333,512 | B2 * | 6/2025 | Cella | ..................... H04L 9/3239 |
| 2014/0365258 | A1 * | 12/2014 | Vestal | ........... G06Q 10/063114 |
| | | | | 901/1 |
| 2016/0307449 | A1 * | 10/2016 | Gordon | .................... G08G 5/55 |
| 2017/0154536 | A1 * | 6/2017 | Kreiner | ................. G06Q 10/00 |

* cited by examiner

*Primary Examiner* — Gertrude Arthur Jeanglaude
(74) *Attorney, Agent, or Firm* — Guntin & Gust, PLC; Colin LaRose

(57) ABSTRACT

Aspects of the subject disclosure may include, for example, a drone orchestrator device, including: a processing system including a processor; and a memory that stores executable instructions that, when executed by the processing system, facilitate performance of operations of receiving instructions from a workflow manager to perform a job involving a payload; and sending a series of commands to a plurality of drones to orchestrate performance of the job autonomously. Other embodiments are disclosed.

20 Claims, 13 Drawing Sheets

200

220

240

241

242

243

244

300

600

SYSTEM AND METHOD FOR ORCHESTRATING DRONE SWARMS

FIELD OF THE DISCLOSURE

The subject disclosure relates to a system and method for orchestrating swarms of drones.

BACKGROUND

Drones should be an inexpensive commodity hardware. Many jobs cannot be performed by a single drone. Drones equipped with processor cores for orchestration in a swarm can be complicated and computationally intensive. Implementing drone orchestrating logic on all drones in a swam wastes resources. Furthermore, intensive processor computations can quickly drain batteries.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for a platform to standardize the development and orchestration of drones-related solutions, connecting customers to tested solutions, recommending the best solutions (by affordability, reliability, availability, and/ or popularity), broker service order transactions, and service orders fulfillment. Other embodiments are described in the subject disclosure.

One or more aspects of the subject disclosure include a drone orchestrator device, including: a processing system including a processor; and a memory that stores executable instructions that, when executed by the processing system, facilitate performance of operations of receiving instructions from a workflow manager to perform a job involving a payload; and sending a series of commands to a plurality of drones to orchestrate performance of the job autonomously.

One or more aspects of the subject disclosure include a non-transitory, machine-readable medium, comprising executable instructions that, when executed by a processing system including a processor, facilitate performance of operations, including presenting a plurality of job types in a user interface to a user for selection; receiving a first selection of a particular job; presenting a plurality of configurations of drones to perform the particular job; receiving a second selection of a first configuration of drones; and sending specification for performing the particular job to a drone orchestrator device, wherein the specification includes the first configuration of drones, and wherein the drone orchestrator device orchestrates performance of the particular job.

One or more aspects of the subject disclosure include a method of displaying, by a processing system including a processor, a plurality of job types in a user interface to a user for selection; receiving, by the processing system, a first selection of a particular job; presenting, by the processing system, a plurality of configurations of drones to perform the particular job; receiving, by the processing system, a second selection of a first configuration of drones; and sending, by the processing system, a specification for performing the particular job to a drone orchestrator device, wherein the specification includes the first configuration of drones, and wherein the drone orchestrator device orchestrates performance of the particular job.

Figure 1:
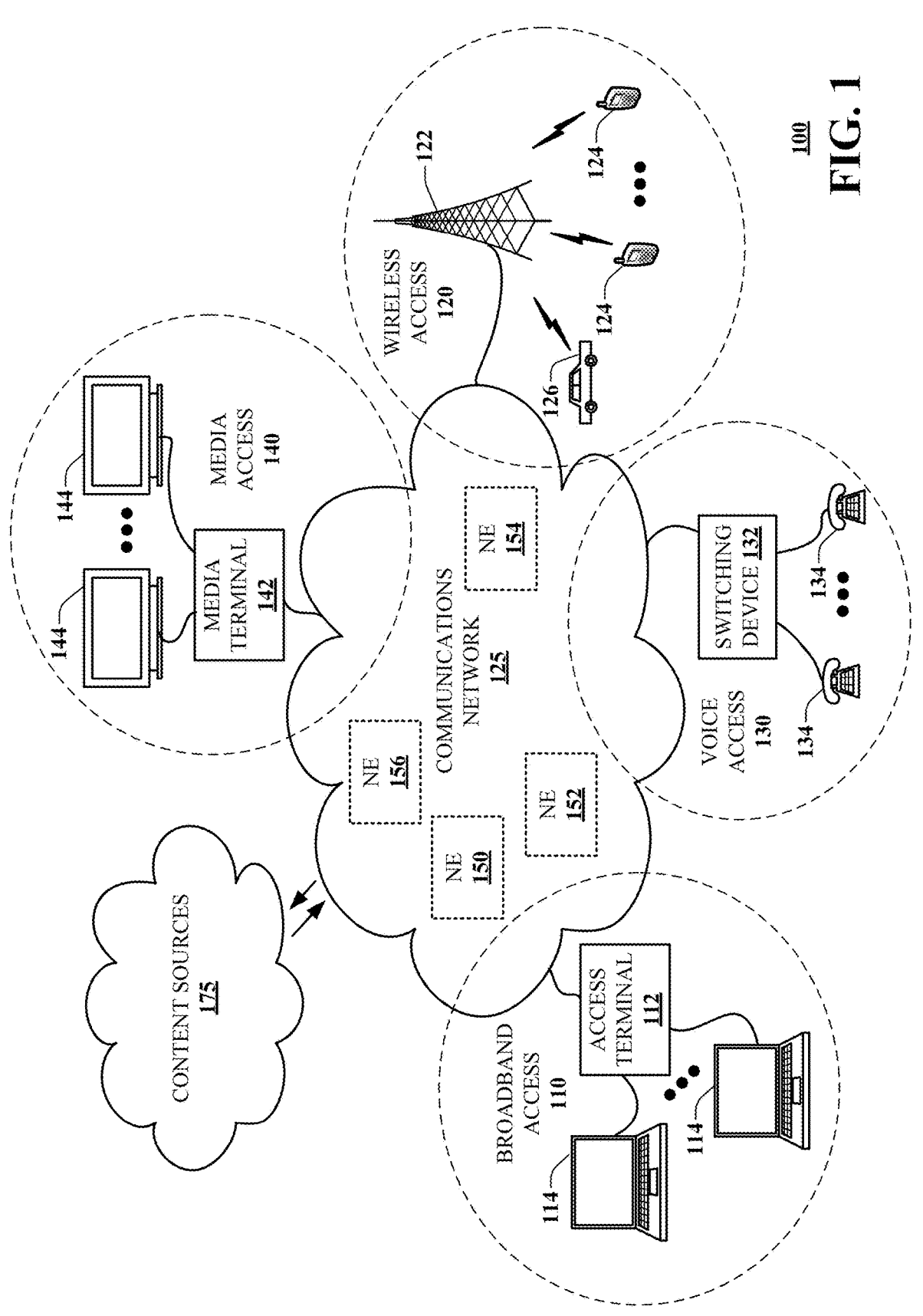
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, system 100 can facilitate in whole or in part receiving instructions from a workflow manager to perform a job involving a payload; and sending a series of commands to a plurality of drones to orchestrate performance of the job autonomously. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

A swarm of inexpensive, commodity drones provides more job options, is readily available, and constitutes a cheaper alternative to a single, giant drone. Inexpensive, commodity drones are barebone hardware that perform simple operations, such as takeoff, lift, and move. In an embodiment, swarm orchestrating logic can be centralized to a server/cluster with high computational ability and having more power. Such swarm orchestrating logic can be embedded in a drone orchestrator device.

In an embodiment, users interact with a workflow manager, which provides a human friendly interface that translates requests into application program interface (API) calls to a drone orchestrator device (a.k.a, Swarm Orchestrator). The Swarm Orchestrator coordinates the operation of inexpensive, commodity drones to act as a single unit, i.e., a swarm.

In an embodiment, various combination of smaller drones may replace larger drones to enhance job resource availability and can become a less expensive alternative to large, sophisticated drones by virtue of cost reductions achieved by mass production.

Figure 2A:
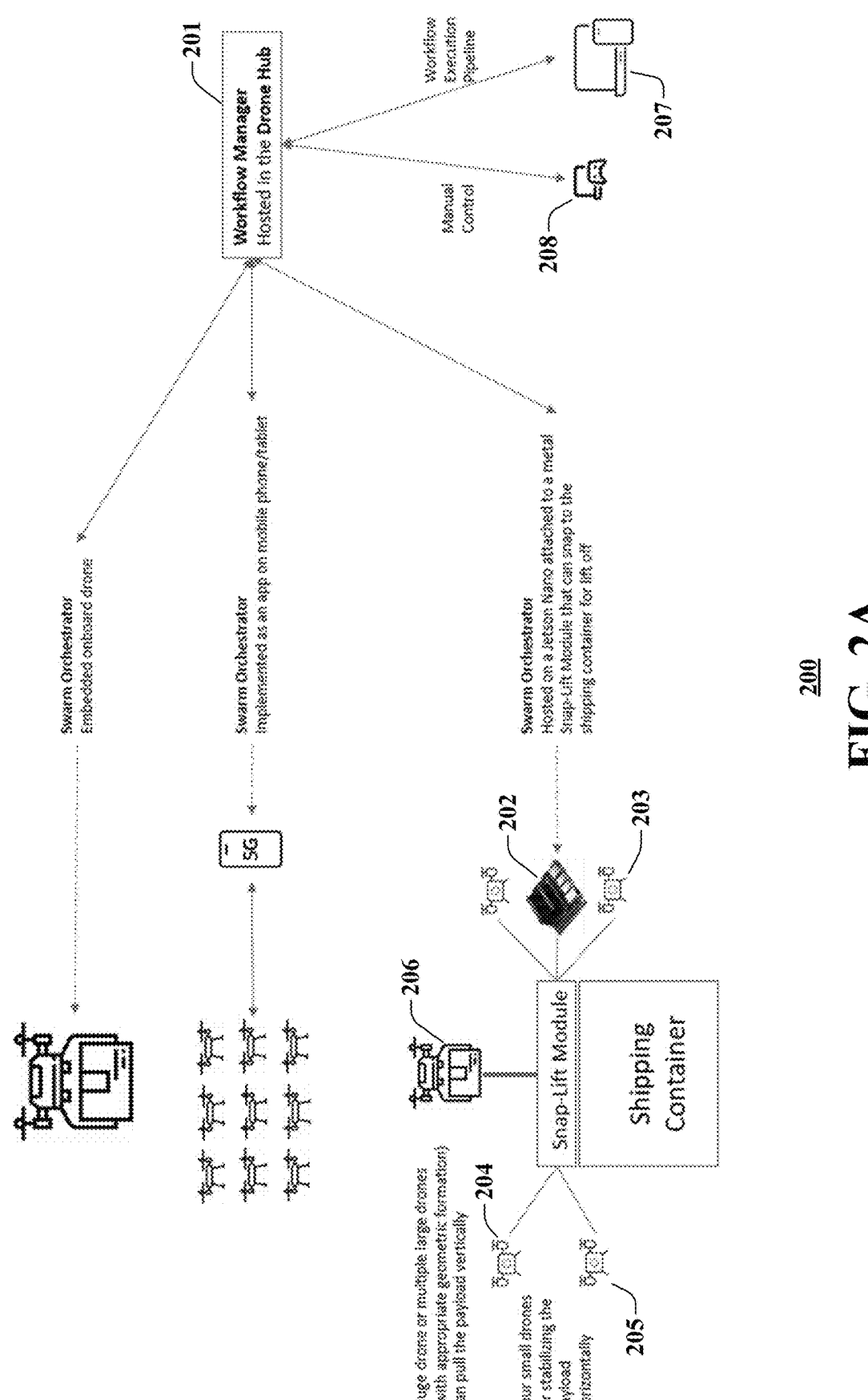
FIG. 2A is a block diagram illustrating an example, non-limiting embodiment of a system for orchestrating a swarm of drones functioning within the communication network of FIG. 1 in accordance with various aspects described herein.

FIG. 2A is a block diagram illustrating an example, non-limiting embodiment of a system for orchestrating a swarm of drones functioning within the communication network of FIG. 1 in accordance with various aspects described herein. As shown in FIG. 2A, system 200 includes a workflow manager 201 hosted in a drone hub, a drone orchestrator device 202, a swarm of drones 203, 204, 205, 206, a user interface 207 and an optional manual controller 208. Workflow manager 201 is software logic responsible for communicating with the drone orchestrator device 202 to execute high-level task(s) affecting the entire swarm by invoking a Swarm Orchestrator API. The workflow manager 201 resides in the drone hub and additionally exposes an API allowing vendors to develop custom user interfaces (GUI) to drive workflow execution. The drone hub is a regional hub representing a drone marketplace that connects to edge devices (e.g., drone controllers, drone orchestrator devices, and vendor apps) to allow faster communication and load distribution. The drone hub hosts various sub-systems that govern the lifetime execution of a workflow, such as: monitoring; tracking devices telemetry; weather conditions; recommendations; risk mitigation; authentication and authorization; and constraint enforcement. The workflow manager 201 will dynamically render API definition metadata into meaning design components. The workflow manager 201 can design workflows where a user can drag/drop components corresponding to appropriate API instructing the Swarm Orchestrator. The components can be chained in sequential order represent a workflow pipeline. Users can debug the workflow pipeline in a simulation mode. The user can save the workflow pipeline for future execution. Users can schedule the workflow pipeline to be executed at a specific time. Users can execute the entire workflow pipeline as-is. A user can interactively execute (step thru) command(s) in a workflow pipeline. User can interactively execute a single command. The user is presented with a list of allowable API in the form of script or graphical components. The user can execute a particular API command by either method suggested below:

Scripting style-Swarm Position (lat., long., altitude);

GUI-Clicking on the component icon representing the Swarm Position Command. Input fields prompt user for lat./long./altitude; and After user input all values, click "Execute"

The drone orchestrator device 202 will internally invoke appropriate drone controller API to orchestrate all the drones in the swarm to the appropriate location default to cube-like formation where the centroid is at the specified lat./long./ altitude. The Swarm Orchestrator should warn user and not execute command if the input data is invalid or potentially damage the swarm. The Swarm Orchestrator should warn user and not execute command where a particular request is not appropriate based on the current state of the swarm. Users can save a sequence of commands executed during the session as a new workflow pipeline. The workflow manager 201 also exposes its own API allowing users/developers to create custom workflow execution GUI as an app for smart devices such as phone, tablet, watch, etc.

Drone orchestrator device 202 includes software logic responsible for coordinating/orchestrating one or more drones in its swarm by invoking a drone controller API. Drone orchestrator device 202 exposes its own API to workflow manager 201 to allow controlling of individual drone(s) within a swarm or a concerto of maneuvers resulting in various unique swarm formation/behavior. For example:

RedLight (toggle, [drone1, drone2, . . . , droneN])—will perform logic: for each drone in parameter list invoke drone.RedLight (toggle).

DodgeObject (distance, angle, relativeto (lat.,long., alt.))—will perform conditional checking based on sensor reading and appropriately for each drone in the swarm invoke drone.Move (x, y, z) where x, y, z represent the new lat., long., altitude for a specific drone.

Drone orchestrator device 202 provides functionality included but not limited to: networking sequence on bootstrap; networking with the drone hub; networking with workflow manager 201; reporting telemetry for all drones in the swarm to the drone hub; performing self-diagnostic tests; and securing public/private key pairs for handshaking. The drone orchestrator device 202 ensures that the drones' controller software pack is compatible and legitimately signed to prevent malicious software. The drone orchestrator device 202 checks with the drone hub to ensure that it's connecting to the appropriate drone(s). The drone orchestrator device 202 authenticates with the drone hub (preferably via a 5G subscriber profile). The drone orchestrator device 202 must validate a vendor developer key with the drone hub to prevent malicious software. The drone orchestrator device 202 can reside as a standalone process on a dedicated operating system (OS) and hardware or as an embedded process along with a drone controller. The drone orchestrator device 202 software can be open sourced by a vendor. The software can be inherited and expand newly built functions from the same library or others with related, reusable components. For example, the system includes a set of base libraries providing basic functionality. New orchestrator software can inherit these base libraries and then add additional logic/functions and/or override certain functions in a subsequent software release. The software can be installed and layered to execute in container environment (such as Docker).

Each drone 203, 204, 205, 206 in the swarm has a drone controller with embedded software installed onto the drone to control basic drone maneuvers and access to onboard peripherals such as: sensors, camera, lights, battery, etc. The drone controller communicates with drone orchestrator device 202 via a client/server protocol and queue messaging. Each drone controller has functionality included but not limited to: networking sequence on bootstrap; networking with the drone hub; networking with drone orchestrator device 202; providing telemetry to drone orchestrator device 202; providing telemetry to the drone hub if the drone orchestrator device is not connected; performing self-diagnostic tests; securing public/private key pairs for handshaking; and following software vendor/version dictates for specific functionality and compatibility in communication protocol/parameters when networking. The drone controller must check with the drone hub to ensure that the drone controller is connecting to the appropriate drone orchestrator device. Further, the drone controller must broadcast its presence to the drone hub (preferably via 5G). Depending on a job constraint, the drone controller might be required to authenticate with the drone hub.

In an embodiment, the swarm of drones may include a plurality of configurations. In an exemplary embodiment, the swarm includes small drones 203, 204, 205 for horizontally stabilizing a payload and a larger drone 206 for providing vertical lift. In an embodiment, swarm orchestration functionality is centralized via drone orchestrator device 202 and includes a client/server protocol with queuing messaging to buffer commands on drone orchestrator device 202. Orchestrator software in drone orchestrator device 202 implements a specific job type that the swarm can perform. Orchestrator exposed APIs Swagger and metadata in Java Script Object Notation (JSON) format allow workflow manager 201 to dynamically generate input user interface components for designing workflows. Workflow execution (i.e., high-level swarm control) is centralized at workflow manager 201, thereby forming a regional hosted distributed cloud. Both drone orchestrator device 202 and drones 203, 204, 205, 206 communicate with the workflow manager 201 to authenticate and get swarm network communication info and access tokens to establish a local network, as set forth in more detail below. Drones will communicate with their respective drone orchestrator device 202 to form a local area network, report telemetry, and wait for commands.

In an embodiment, before the swarm is formed, drones 203, 204, 205, 206 and drone orchestrator device 202 report telemetry directly to a drone hub. Once the swarm is formed, all telemetry will be relayed to the drone hub via drone orchestrator device 202.

Constraints, telemetry data, and environment data determine whether a job can be performed. Some constraints can be overridden for an entire operation session or only for a short period. Orchestration APIs and metadata will be used to dynamically render GUI components for users to easily design workflows. Leveraging telemetry data and environment data to enforce various constraints defined by orchestrators and system for risk mitigation and governance.

Applications for the system include embodiments that are not limited to: transporting shipping containers (payload options: xs, small, large, etc.); transporting mail containers (payload options: xs, small, large, etc.); performing a light show (swarm sizes: 16, 32, 100, 200, etc.); displaying an ad banner (options: x, y, z); transporting a livestock pod (payload options: xs, small, large, etc.); providing crane service (at a construction site, payload capacity: xs, small, large, etc.); car lift-lifting an entire specialty car from a traffic-jam to destination parking lot; dropping a pod, then providing surveillance; or as an equipment rental. Potential customers include construction companies, lumber companies, etc. Complete equipment combinations can be shipped to a customer specified delivery address (i.e., jobsite, facility, home, etc.). Customers may also execute their own custom workflows. In an embodiment, the system may be used to manage a fleet of drones owned and maintained by a company. Companies can manage their own job modules but may also augment their fleets and operations using this system.

Figure 2B:
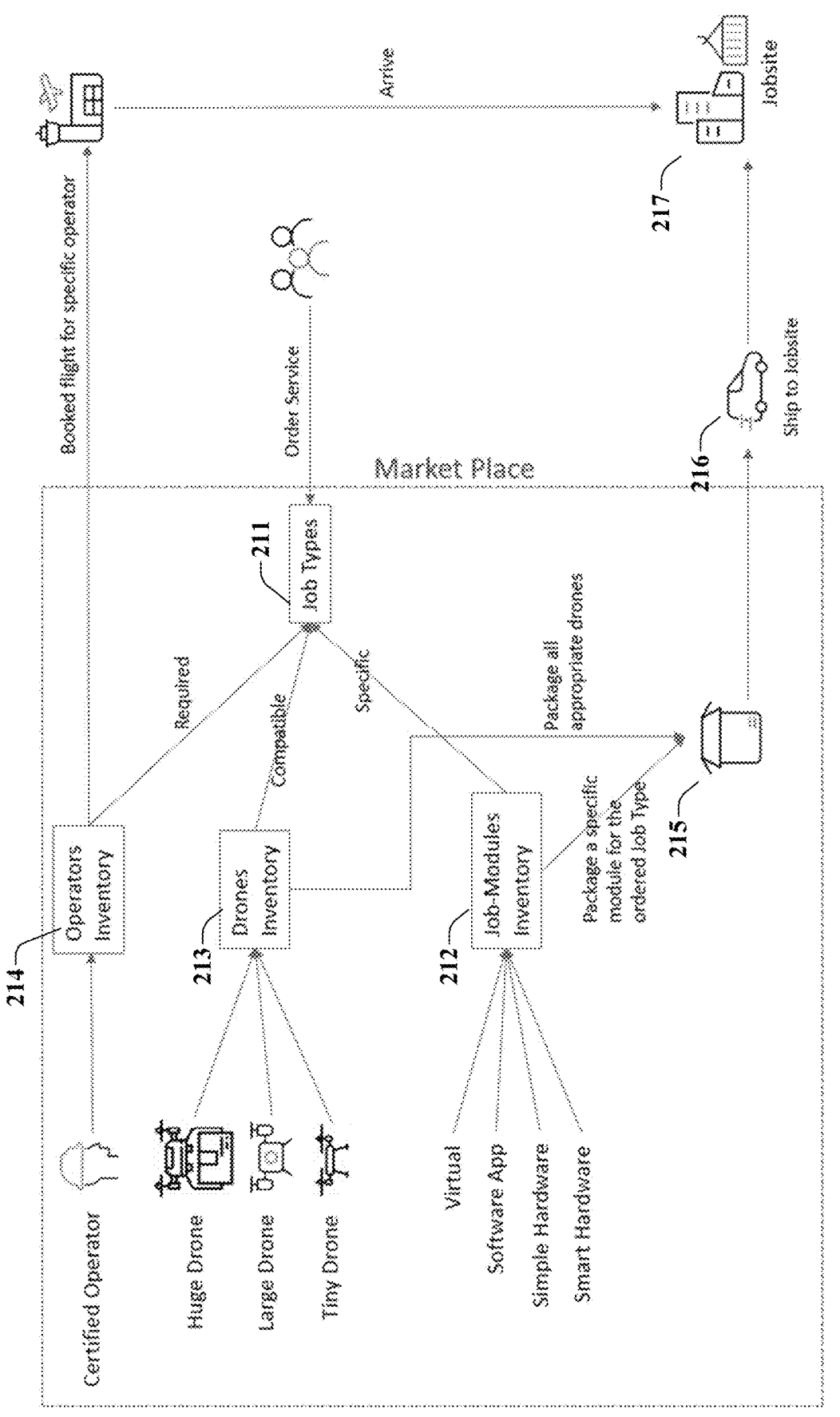
FIG. 2B is a block diagram illustrating an example, non-limiting embodiment of a marketplace for deployment of a swarm of drones for performing a job functioning within the communication network of FIG. 1 in accordance with various aspects described herein.

FIG. 2B is a block diagram illustrating an example, non-limiting embodiment of a marketplace for deployment of a swarm of drones for performing a job functioning within the communication network of FIG. 1 in accordance with various aspects described herein. As shown in FIG. 2B, system 210 comprises a user interface 211 at a workflow manager that provides a plurality of job types and drone configurations for performing a job. The marketplace is a portal for providers to supply qualified drones, qualified job modules, and certified operators to inventory, which will be used to efficiently provide service to customers. Customers are presented with a list of job types to choose from. In an embodiment, a job type is a list of services offering on the drone marketplace. For example: transporting a shipping container, a mail container, performing a light show, displaying an ad banner, transporting a livestock pod, providing crane service, relocating a car, etc. The list of job types may grow based on services that vendors of the drone orchestrator module can provide. Specific resources combinations required for a job types are hidden from users. For example: a user does not need to know that a transport job requires two large drones instead of 6 small drones. The job types will be presented with a total cost so that the users can decide based on cost versus earliest availability, based on resource combinations. The system will dynamically calculate the earliest date a specific job type is available for service booking based on job type resource requirements and availability of drones, job module, and operators. The system will determine the delivery date (to start job) based on the longest delivery time of all resources in the combination to the resources delivery address.

In a managed job, the system stages all the resources at a flight facility ("drone-port") closest to the jobsite. A delivery address is the chosen by the flight facility address. In an embodiment, the system dispatches a combination of a job module and a swarm of drones as a unit. In an embodiment, the system ships these resource(s) from warehouse(s) closest to the resources delivery address.

In an embodiment, the system provides a dashboard indicating a job status. The system may provide a real-time visualization or a projected simulation so that the user may watch the operation as it progresses.

In an embodiment, a user places an order by selecting a job type from among those types supported by a job-modules inventory 212. The user then provides specifications for the job. The specifications include a configuration of drones, including numbers and combinations commensurate with a size of a payload, for performing the job from a drone inventory 213. Specified drone type, size, manufacturers, grabbing and lifting capacity, etc. that are qualified. The specifications may also include predefined workflows (or flight plans), and FAA approval of flight plan/pattern where applicable. The specifications may also contain common constraints, such as: Weather: no rain, snow, windy, etc.; temperature: 20F-100F; census: no population zone, etc.; regulatory: flying permit uploaded; battery (all drones)

must be at least: 20% (implicitly reserved 15% for an abort-procedure. The last 5% implicitly reserved to compensate for marginal error); or custom constraints, such as: wind drag telemetry value is within specification; payload weight telemetry value must remain within specification; payload stability telemetry value must remain within specification. In an embodiment, the payload specification may not be a single value, but rather a range specification. For example: xs might denote maximum weight: 10 kg, maximum volume: 20 m$^3$, fluid dynamic index <3 (not too shaky).

In an embodiment, if the job type requires a human operator, then an operator is selected from an operators inventory 214. The operator would manually control/execute workflow. For example: demonstrate various swarm formations on-demand in a light show, towing of woods in a forest to a clear site, or lifting supplies for a campsite to mountain top. Once the job is booked, drones from the drone inventory and a drone orchestrator device are packaged 215 and shipped 216 to the job site 217 dictated by the specifications.

Figure 2C:
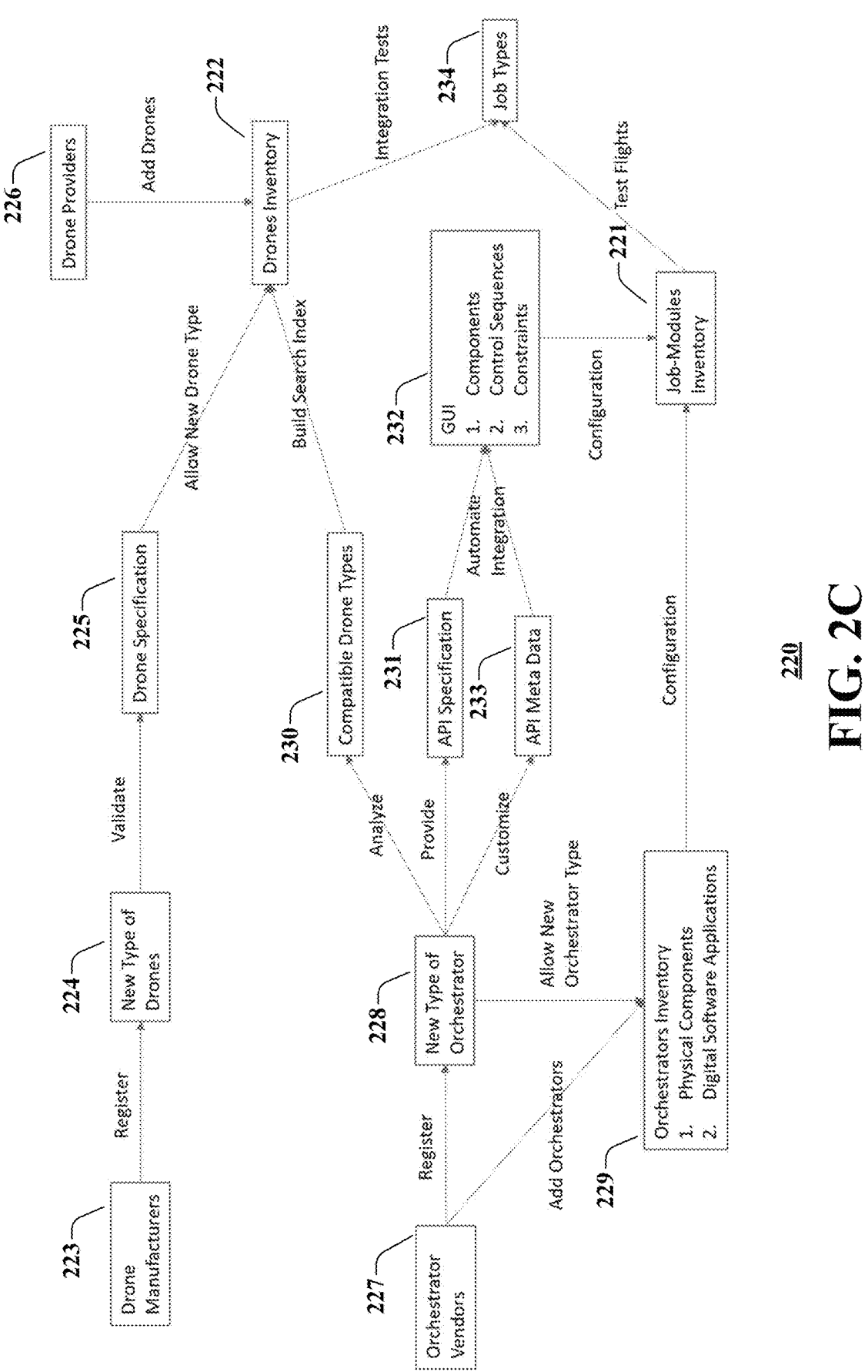
FIG. 2C is a block diagram illustrating an example, non-limiting embodiment of a registration processes for creating inventories for performing a job specified by the system of FIG. 2B in accordance with various aspects described herein.

FIG. 2C is a block diagram illustrating an example, non-limiting embodiment of a registration processes for creating inventories for performing a job specified by the system of FIG. 2B in accordance with various aspects described herein. As shown in FIG. 2C, system 220 comprises a job-modules inventory 221 and a drone inventory 222. A job module is an entity essential in orchestration a drone swarm to accomplish a job service. There are various forms of job modules (which are illustrated in FIG. 2A):

Virtual-A Swarm Orchestrator Process is embedded onboard drone with capable networking connectivity (5G)

App-A Swarm Orchestrator implemented as an app and can be downloaded to smart devices (PCs, laptops, phones, tablets, watches, etc.) with capable processing power and network connectivity (5G).

Simple Hardware Module-equipment adapted for attachment to drones and able to quickly snap itself securely on to the shipping containers, pods, etc. to easily assemble, transport, de-assemble and reuse. The Swarm Orchestrator is hosted on a dedicated computing hardware (i.e.: Jetson Nano, laptop, special purpose computer, etc.) which mounted securely on the Hardware Module In an embodiment, the 5G network card can plug directly to the computing hardware. A Smart Hardware Module has all the criteria of the Simple Hardware Module, but allows a mountable/snap-in to incorporate peripheral gadgets such as:

Sensors—Thermometer, pressure reader, scale, etc.

Projectors—Hologram generation, VR simulation.

Cameras—Surveillance, 3D filming, cinematography production, etc.

Interchange—able Utility Tools (lumber jack, mining, drilling, spraying various fluid, harvester, etc.)

Robotics—multiple arms to pick up items, trimming trees, perform human-like tasks in hostile environment, etc.

Weapons

Each peripheral can be connected to the computing hardware to perform robotic functions. Vendors supplying the Job Module are responsible for:

Implementing Swarm Orchestrator Logic

Initial certification for each new unique Module before available in Market Place inventory.

Availability in stages: Beta, Preview, General Release, Specific Regions (regulatory requirement)

Developers can contribute expansion logic in the form of software patch to Swarm Orchestrator Logic (where applicable and allowable by vendors). In the case of Virtual and App format, developers can apply for a developer program to deploy Swarm Orchestrator Software and share royalty income when consumers bought a Job Service that employed the respective software.

As shown in FIG. 2C, drone manufacturers 223 register new type of drones 224. The system validates specifications 225 for the new type of drone, which is then added to the drone inventory 222. Additionally, drone providers 226 may add drones to the drone inventory 222.

As shown in FIG. 2C, drone orchestration device vendors 227 register new types of drone orchestrator devices 228, which can be used to create an orchestrator inventory 229 of drone orchestrator hardware and software. The system analyzes the new orchestrator type to find compatible drone types 230. Further, the new orchestrator type provides an API specification 231, which the system uses to automate a user interface 232. Additionally, the new orchestrator type provides API metadata 233, which the system uses to integrate into the user interface 232, as illustrated in more detail below. The system configures the job-modules inventory from the user interface 232 and the orchestrator inventory 229. Finally, the system performs test flights using drones from the drone inventory 222 and tasks from the job-modules inventory 221 to determine job types 234 presented to the user.

Workflows can have many constraints for risk mitigation; but allow operator to override constraint violation where applicable. For example:

Reject workflow execution due to violating constraint (rainy). Operator can override with reason ("still sunny observed")

Reject workflow execution due to no permit uploaded. Operator can override with reason ("permit not required in my town")

Constraints can be specified to allow override for a period of time and operator must recertify when expired. For example:

It has been 1 hour passed and weather data still indicated rainy at the job site. Operator will be asked to recertify his prior override decision to continue. The system will continue to monitor and trigger the validation every 1 hour (or preconfigured frequency)

Battery currently 15% below recommended threshold 20%. Operator will be asked to recertify his decision to continue doing the light show. The system will continue to monitor and trigger recertification when the battery drops another 5% (or preconfigured reduction differential)

Workflow can have constraints where an override is not permitted. For example:

Transporting a shipping container from city A to city B where the distance is so far that the weather constraint might not be safe to allow override.

Battery level below threshold and this job is for transporting where abort-procedure required rerouting to a designated nearby landing site/facility.

The system uses telemetry data along with external data feeds such as weather, traffic, census data (population) to dynamically validate constraints. If a constraint is violated prior to workflow execution, then the workflow manager will reject any execution request (i.e., lock down control).

If a constraint detected during workflow execution, then operator has a certain timeframe (configurable value) to response (override); otherwise, the workflow manager can execute a predefined "Abort-Procedure Workflow." An Abort-Procedure Workflow is an automated task sequence to be executed when constraint(s) are detected; but an operator fails to override in time, choose not to override, or cannot override. There can be various Abort-Procedure Workflows to be executed depending on various conditions. For example:

Prior to a workflow execution, abort procedure can be simply as powering off drones.

During workflow execution where the swarm are flying with a payload, system detecting rain, abort procedure can be elaborated tasks to safely move to nearby cleared area and slowly descend and land.

Similar to above but detecting battery of a drone too low to accomplish mission then abort procedure is to reroute to a nearby landing zone.

Abort-Procedure Workflows are required for some Job types, either by regulators or to mitigate risk/liability. For example:

landing the payload in a designated or safe location when a drone might not have enough battery to complete the entire transport task.

landing the surveillance drone in an empty field instead of in the middle of the busy intersection when the drone is forecasted to not be able to make it back to base.

Figure 2D:
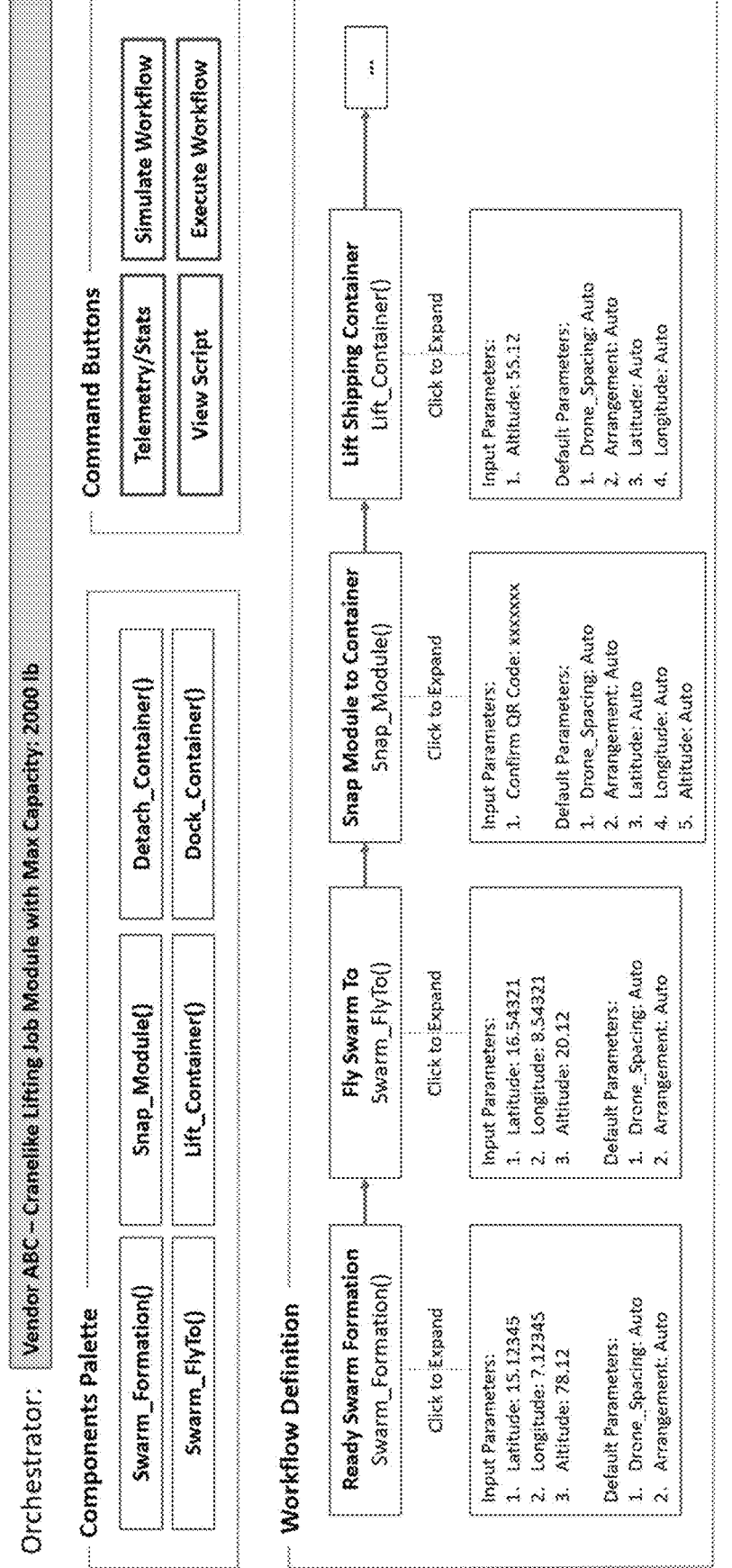
FIG. 2D is a block diagram illustrating an example, non-limiting embodiment of a workflow manager user interface designer for creating workflows that perform a job specified by the system of FIG. 2B in accordance with various aspects described herein.

FIG. 2D is a block diagram illustrating an example, non-limiting embodiment of a workflow manager user interface designer for creating workflows that perform a job specified by the system of FIG. 2B in accordance with various aspects described herein. As shown in FIG. 2D, the user interface 240 illustrates a component palette that is dynamically loaded based on orchestrator type. Various command buttons and workflow definitions can be invoked. Default parameters are optimally calculated and/or relatively derived; but can be explicitly defined by users.

Figure 2E:
FIG. 2E is a block diagram illustrating an example, non-limiting embodiment of an API and metadata mapping into a dynamically rendered user interface component for creating workflows that perform a job specified by the system of FIG. 2B in accordance with various aspects described herein.

FIG. 2E is a block diagram illustrating an example, non-limiting embodiment of an API and metadata mapping into a dynamically rendered user interface component for creating workflows that perform a job specified by the system of FIG. 2B in accordance with various aspects described herein. As illustrated in FIG. 2B, the JSON code maps 241 to a user interface specified by the code.

Figure 2F:
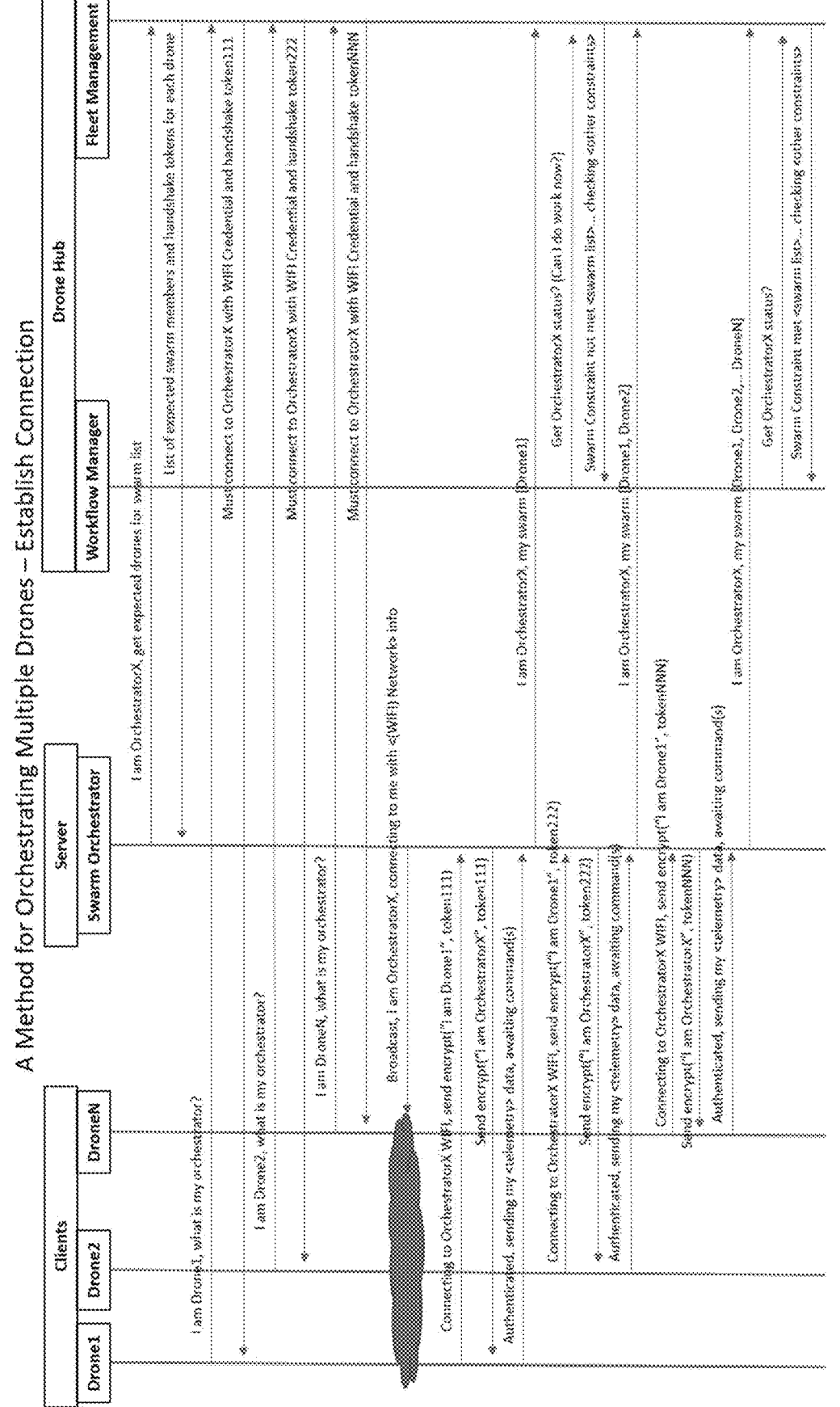
FIG. 2F is a block diagram illustrating an example, non-limiting embodiment of a method of establishing a connection of a drone hub with a swarm of drones that perform a job specified by the system of FIG. 2B in accordance with various aspects described herein.

FIG. 2F is a block diagram illustrating an example, non-limiting embodiment of a method of establishing a connection of a drone hub with a swarm of drones that perform a job specified by the system of FIG. 2B in accordance with various aspects described herein. As shown in FIG. 2F, method 242 can be used separately to orchestrate attached devices such as robotic arms, sensors, video recorders, etc. The method assumes that a swarm contains a combination of one or more drones to be coordinated by the orchestrator to perform tasks. In an embodiment, the drone hub has a list of expected drones for a given Orchestrator. The method assumes that a Swarm Constraint is a specific constraint to validate that all drones in a swarm to be connected to the Swarm Orchestrator. The workflow manager must check for all constraints to be met before allowing work to started or tasks to be executed. Some constraints can be override by qualified administrator/operator. Handshake tokens will be used to encrypt messages between each Orchestrator-Drone pair.

Figure 2G:
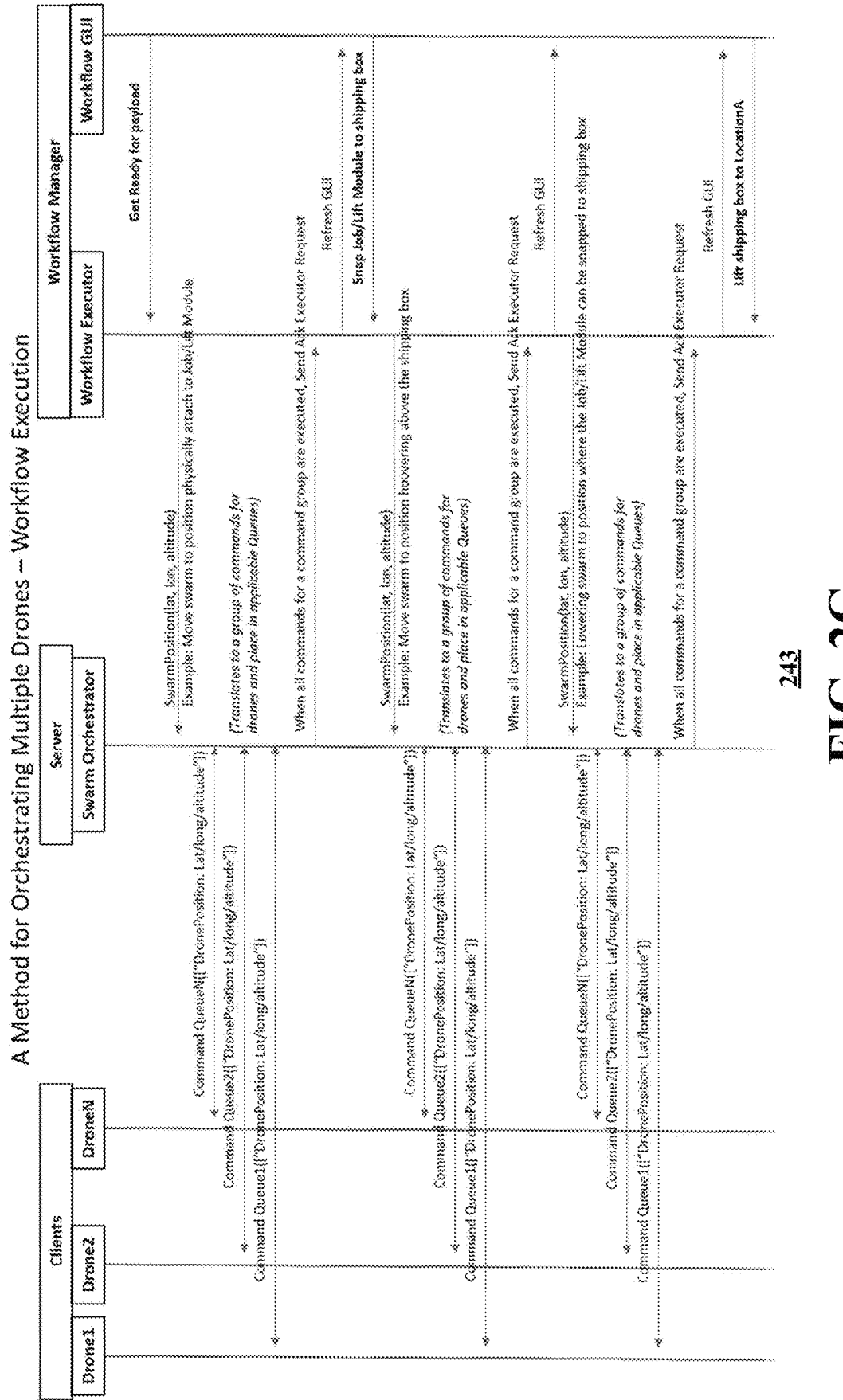
FIG. 2G is a block diagram illustrating an example, non-limiting embodiment of a method of workflow execution for a swarm of drones that perform a job specified by the system of FIG. 2B in accordance with various aspects described herein.

FIG. 2G is a block diagram illustrating an example, non-limiting embodiment of a method of workflow execution for a swarm of drones that perform a job specified by the system of FIG. 2B in accordance with various aspects described herein. As shown in FIG. 2G, method 243 has a Swarm Orchestrator Server that maintains a separate Command Queue for each Drone Client. Drones perform commands in order from their respective Message Queue. If telemetry shows a given drone is not at the expected proximity, then clear the Command Queue and enQueue new commands to get the drone from current location to expected location. The Swarm Orchestrator must maintain telemetry data for all drones/devices and will selectively update when meta data explicitly reported. Drones will only report new/updated/critical telemetry data.

A Workflow can have multiple tasks. A task can translate to multiple Swarm Orchestrator Requests. Each Orchestrator Request can result in multiple Command Messages (group of commands) for each drone. The Orchestrator maintains an orchestrator-queue to batch requests as needed. In a batch-mode, the entire workflow requests are sent to Swarm Orchestrator for Queuing, acknowledgement for each request will be sent from orchestrator as execution is completed. In an interactive-mode, each request is sent to Swarm Orchestrator and Acknowledgement is required before sending next request (interactively).

Figure 2H:
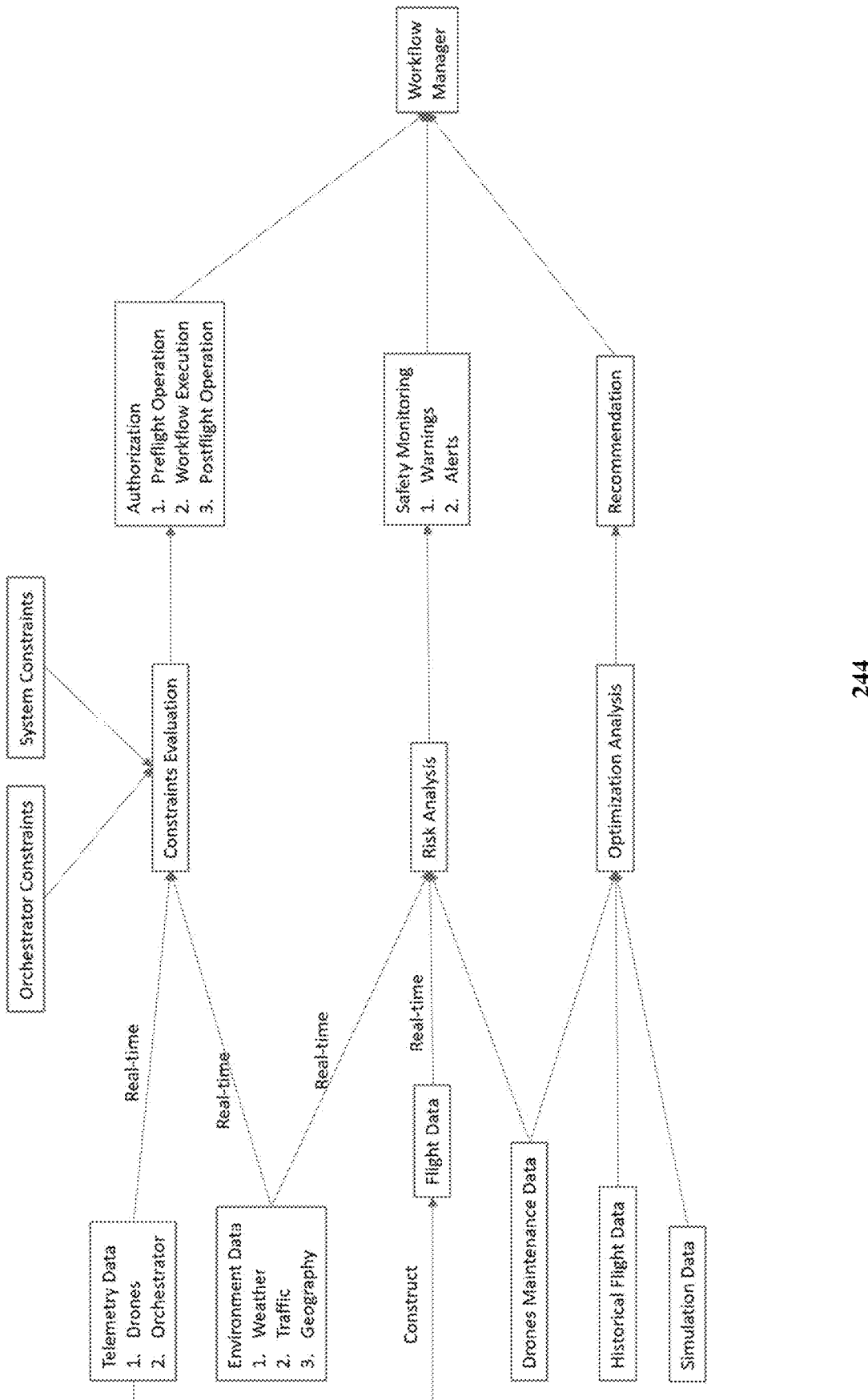
FIG. 2H is a block diagram illustrating an example, non-limiting embodiment of data flow while monitoring and mitigating risk during workflow execution for a swarm of drones that perform a job specified by the system of FIG. 2B in accordance with various aspects described herein.

FIG. 2H is a block diagram illustrating an example, non-limiting embodiment of data flow while monitoring and mitigating risk during workflow execution for a swarm of drones that perform a job specified by the system of FIG. 2B in accordance with various aspects described herein. As shown by diagram 244 in FIG. 2B, the data flows into a workflow manager. In an embodiment, the system may use reinforcement learning simulations to identify risky routes, risky flight plans, risky swarm formations, risky workflows, etc. External data feeds (such as weather, traffic, census, etc.) help to forecast and real-time risk mitigation. The system may use digital twining to facilitate various model simulations (inventory optimization, routing optimization, workflow optimization, what-if, potential risk-analysis, real-time risk-prevention/alerting). Digital twining components may include:

Digital drones (based on vendors drone model spec, usage degradation, historical failure/maintenance, etc.)

Digital maneuvers (required to be submitted by drone vendors before allowing such drone model into inventory, will be used for orchestration simulation).

Digital workflows (based on simulated data, real-time telemetry data, external data feed applicable to jobsite)

Digital flight plans (showing entire path and current progress, forecast completion, identify potential risks, real-time rerouting, emergency path)·

Digital inventory by regions (maximize swarm combination availability, quick replacement, lowest cost swarm combination) including drones, job type modules and certified operators.

Digital Drone Hubs (simulate network load distribution, response time, latency, disaster recovery, etc.)

The system may use mining of historical data to mitigate risk. Such data may include:

Battery Telemetry—forecasting battery usage/degradation for a specific drone performing specific job type at a given jobsite (weather condition, etc.)

Flight and Workflow Execution Data—forecasting job completion, duration, risk factors (multi-class) and propensity, etc.

Job Type Service Requested Data—forecast inventory, seasonal, regional, etc.

In an embodiment, the system may provide a dashboard and digital-twin models (enabled remote/metaverse collaboration) that enable expert operators and engineers to assist remotely, administrators to monitor progress, regulators to certify compliance, a safety audit, and provide training for operators.

While for purposes of simplicity of explanation, the respective processes are shown and described as a series of blocks in FIGS. 2A-2C and 2F-2H, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
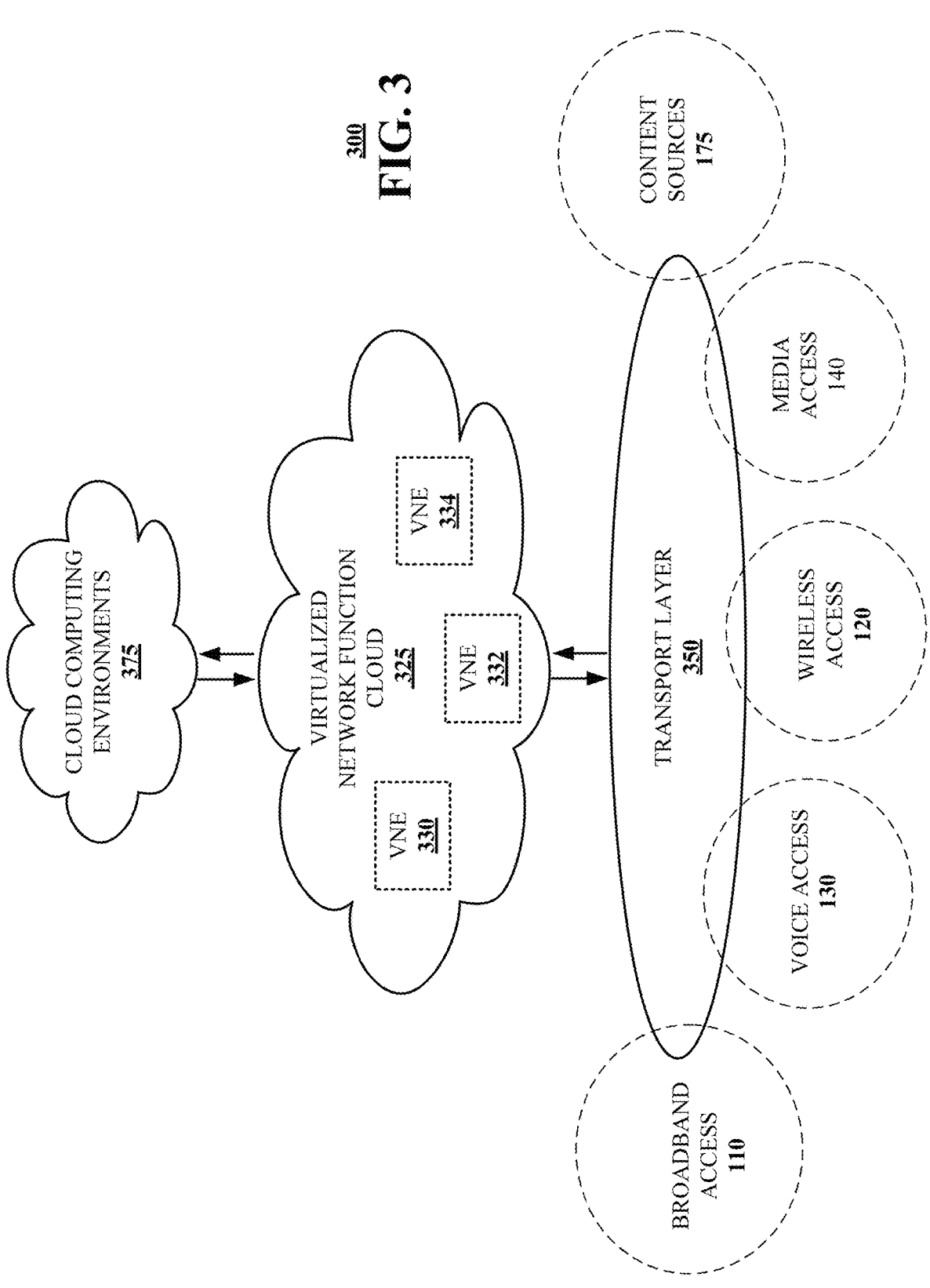
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and methods 240-244 presented in FIGS. 1, 2A-2H and 3. For example, virtualized communication network 300 can facilitate in whole or in part receiving instructions from a workflow manager to perform a job involving a payload; and sending a series of commands to a plurality of drones to orchestrate performance of the job autonomously.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
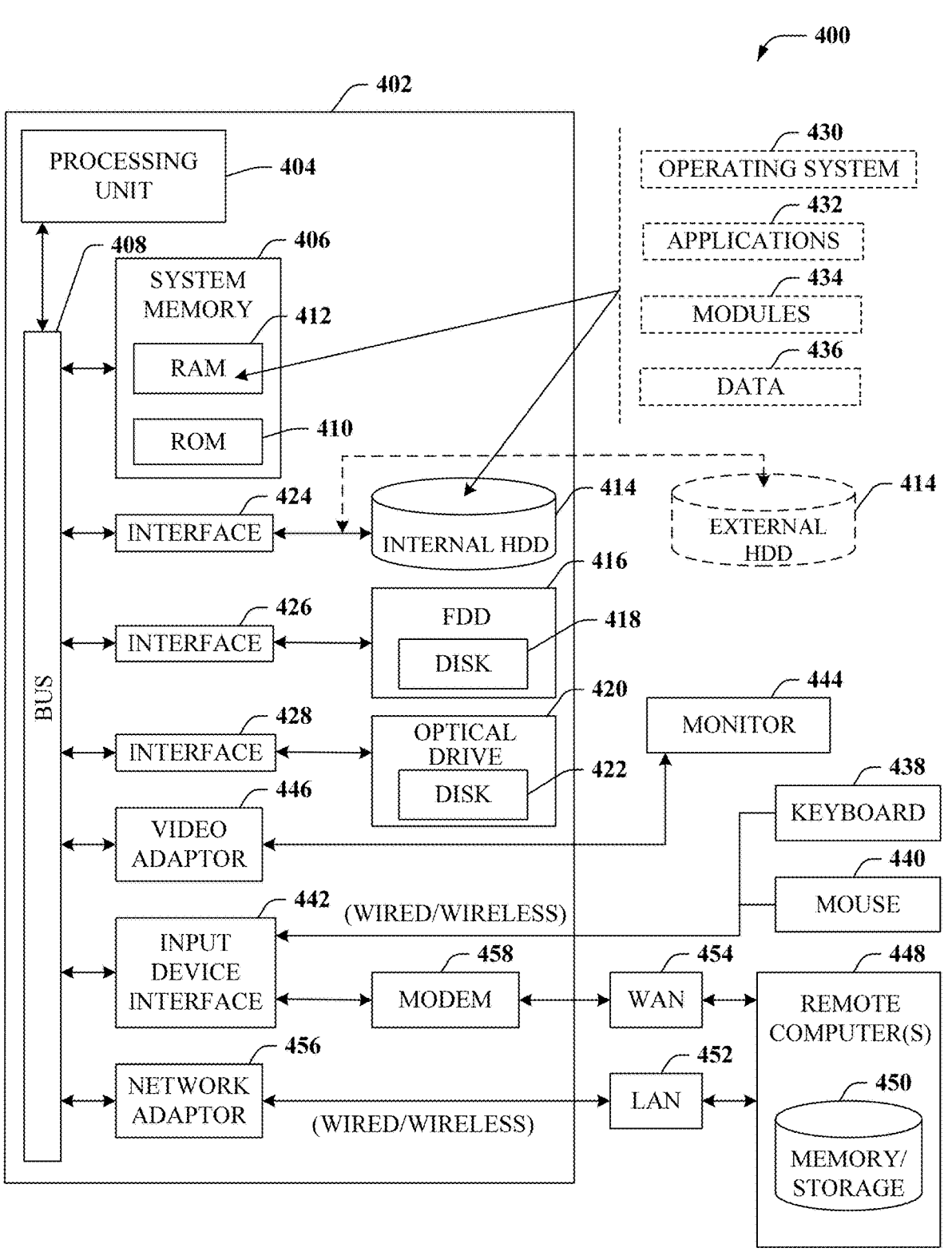
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part receiving instructions from a workflow manager to perform a job involving a payload; and sending a series of commands to a plurality of drones to orchestrate performance of the job autonomously.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device

450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
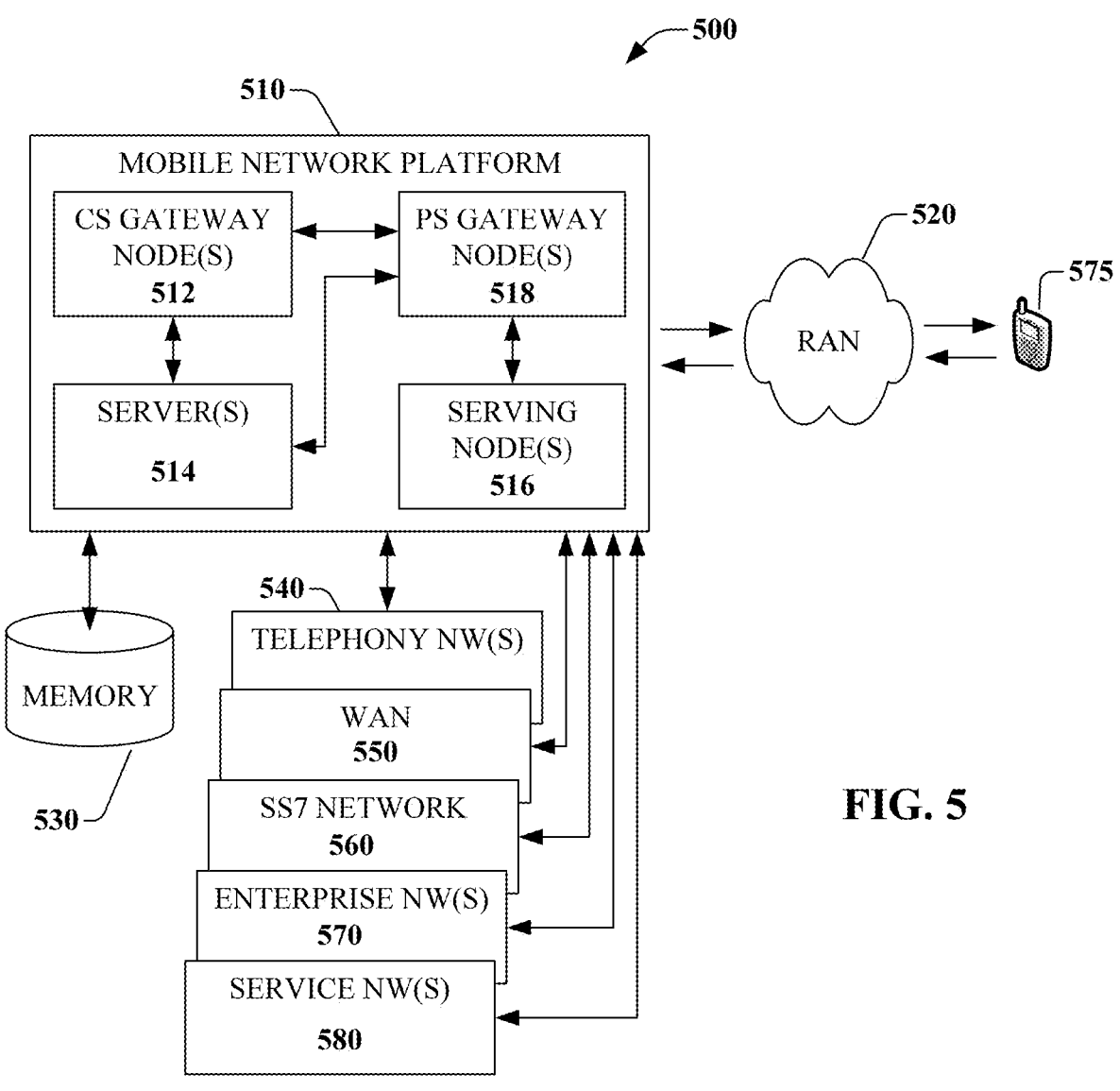
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part receiving instructions from a workflow manager to perform a job involving a payload; and sending a series of commands to a plurality of drones to orchestrate performance of the job autonomously. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
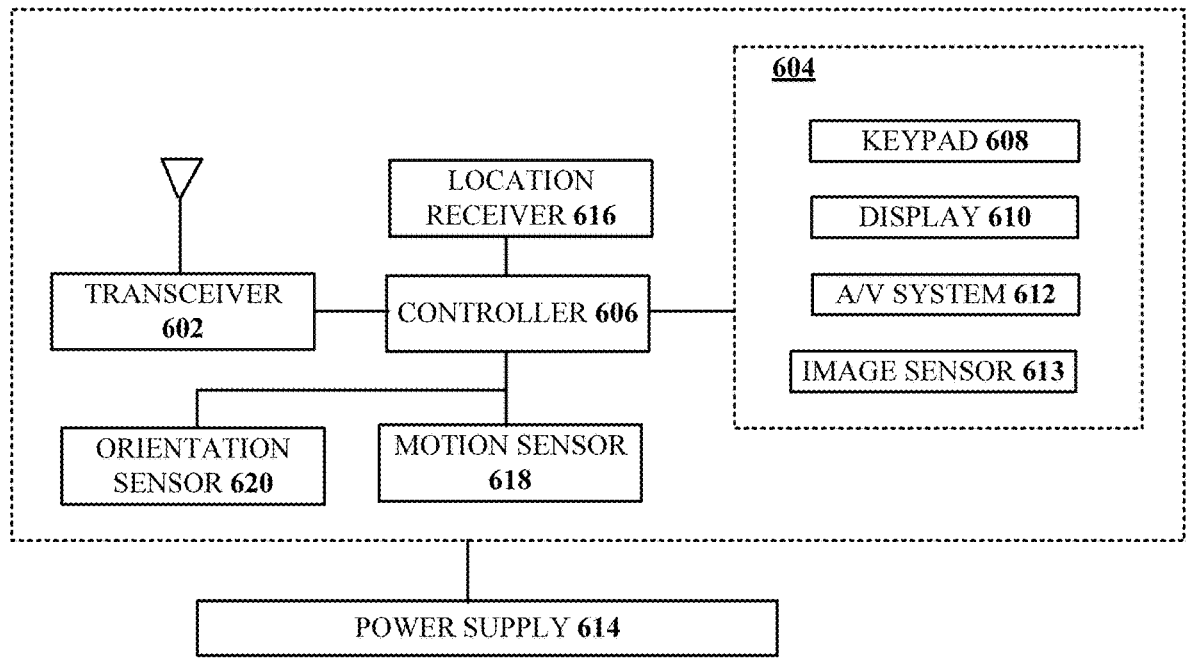
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part receiving instructions from a workflow manager to perform a job involving a payload; and sending a series of commands to a plurality of drones to orchestrate performance of the job autonomously.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage, "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, f (x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A drone orchestrator device, comprising:
a processing system including a processor; and
a memory that stores executable instructions that, when executed by the processing system, facilitate performance of operations, the operations comprising:
receiving instructions from a workflow manager to perform a job involving a payload;
sending a series of commands to a plurality of drones to orchestrate performance of the job autonomously;

receiving telemetry data from the plurality of drones during performance of the job;
forwarding the telemetry data to the workflow manager;
obtaining an instruction from the workflow manager to abort the job; and
instructing the plurality of drones to abort the job in response to the obtaining.

2. The drone orchestrator device of claim 1, wherein the drone orchestrator device is adapted for attachment to the payload.

3. The drone orchestrator device of claim 2, wherein the job comprises transporting, rotating or adjusting the payload from a first location to a second location.

4. The drone orchestrator device of claim 2, wherein a number of the drones is commensurate with a size of the payload.

5. The drone orchestrator device of claim 2, wherein a number of the drones is commensurate with a grabbing and lifting capacity of each drone.

6. The drone orchestrator device of claim 1, wherein the workflow manager presents a listing of jobs for selection by a user through a user interface.

7. The drone orchestrator device of claim 6, wherein the user may select a configuration of drones from a plurality of configurations to perform the job through the user interface.

8. The drone orchestrator device of claim 7, wherein each configuration in the plurality of configurations is associated with a cost to perform the job.

9. The drone orchestrator device of claim 1, wherein the processing system comprises a plurality of processors operating in a distributed computing environment.

10. A non-transitory, machine-readable medium, comprising executable instructions that, when executed by a processing system including a processor, facilitate performance of operations, the operations comprising:
presenting a plurality of job types in a user interface to a user for selection;
receiving a first selection of a particular job;
presenting a plurality of configurations of drones to perform the particular job;
receiving a second selection of a first configuration of drones;
sending a specification for performing the particular job to a drone orchestrator device, wherein the specification includes the first configuration of drones, and wherein the drone orchestrator device orchestrates performance of the particular job;
receiving telemetry data from the drone orchestrator device during performance of the particular job;
determining that a predetermined risk constraint is violated based on the telemetry data;
issuing an instruction to abort the particular job in response to the determining;
ascertaining that the instruction to abort the job is (1) not overridden by an operator within a predetermined time period, and/or (2) not permitted to be overridden based on a predetermined rule; and
providing the instruction to the drone orchestrator device in response to the ascertaining.

11. The non-transitory, machine-readable medium of claim 10, wherein the operations further comprise selecting the first configuration of drones from an inventory of available drones.

12. The non-transitory, machine-readable medium of claim 10, wherein the operations further comprise selecting an operator to control the first configuration of drones from an inventory of available operators.

13. The non-transitory, machine-readable medium of claim 10, wherein the drone orchestrator device orchestrates completion of the particular job autonomously.

14. The non-transitory, machine-readable medium of claim 10, wherein the first configuration specifies a payload.

15. The non-transitory, machine-readable medium of claim 14, wherein the first configuration specifies a number of the drones and a type of the drones.

16. The non-transitory, machine-readable medium of claim 15, wherein the number of the drones is commensurate with a size of the payload.

17. The non-transitory, machine-readable medium of claim 15, wherein the number of the drones is commensurate with a grabbing and lifting capacity of each drone.

18. The non-transitory, machine-readable medium of claim 10, wherein each configuration in the plurality of configurations is associated with a cost to perform the particular job.

19. The non-transitory, machine-readable medium of claim 10, wherein the processing system comprises a plurality of processors operating in a distributed computing environment.

20. A method, comprising:

displaying, by a processing system including a processor, a plurality of job types in a user interface to a user for selection;

receiving, by the processing system, a first selection of a particular job;

presenting, by the processing system, a plurality of configurations of drones to perform the particular job;

receiving, by the processing system, a second selection of a first configuration of drones; and sending, by the processing system, a specification for performing the particular job to a drone orchestrator device, wherein the specification includes the first configuration of drones, and wherein the drone orchestrator device orchestrates performance of the particular job;

receiving telemetry data from the drone orchestrator device during performance of the particular job;

determining that a predetermined risk constraint is violated based on the telemetry data;

issuing an instruction to abort the particular job in response to the determining;

ascertaining that the instruction to abort the job is (1) not overridden by an operator within a predetermined time period, and/or (2) not permitted to be overridden based on a predetermined rule; and providing the instruction to the drone orchestrator device in response to the ascertaining.

* * * * *